United States Patent [19]

Hansen

[11] Patent Number: 4,513,847

[45] Date of Patent: Apr. 30, 1985

[54] RANGE SHIFT AND PARK LOCK CONTROL

[75] Inventor: Kenneth N. Hansen, Waukesha, Wis.

[73] Assignee: Allis-Chalmers Corporation, Milwaukee, Wis.

[21] Appl. No.: 430,012

[22] Filed: Sep. 30, 1982

[51] Int. Cl.³ .............................................. B60K 41/26
[52] U.S. Cl. .............................. 192/4 A; 74/471 XY
[58] Field of Search ............. 192/4 A, 4 R; 74/473 R, 74/473 P, 471 XY; 267/155

[56] References Cited

U.S. PATENT DOCUMENTS

| 3,241,640 | 3/1966 | McCordic et al. | 192/4 A |
| 3,625,032 | 12/1971 | Muhleck | 74/473 R |
| 3,626,780 | 12/1971 | Lowder et al. | 74/473 R |
| 3,793,901 | 2/1974 | Muller et al. | 192/4 A |
| 3,987,878 | 12/1976 | Hansen | 192/4 A |
| 4,060,157 | 11/1977 | Hillstrom | 192/4 A |
| 4,371,063 | 2/1983 | Troemner et al. | 192/4 A |

Primary Examiner—George H. Krizmanich
Attorney, Agent, or Firm—Charles L. Schwab

[57] ABSTRACT

A single manually operated control lever is operable to operate a range shift mechanism and a park lock mechanism in a vehicle transmission. The control lever is pivoted to a pivot bracket on a first horizontal axis and the pivot bracket is pivoted to a stationary console on a second horizontal axis lying in a plane normal to the first axis. The control lever selectively and alternatively engages notches in a pair of operating members connected to the range shift and park lock mechanisms. A spring interacting between the pivot bracket and the control lever biases the latter into engagement with the notch on the range shift operating member.

6 Claims, 7 Drawing Figures

RANGE SHIFT AND PARK LOCK CONTROL

This invention relates to a transmission control lever and, more particularly, to a park lock and range transmission control mechanism. The control mechanism includes a park lock control member and a gear shift control member selectively and alternatively operated by a control lever.

The drive line of the tractor includes a transmission to provide selective gear ratios for drive speeds depending on the type of field operation required. A range transmission between the main transmission and the propeller shaft provides a multiple of the drive speeds of the main transmission. Since the range transmission drives into the propeller shaft and the park lock locks the propeller shaft when the park lock is actuated, a single control lever can be used to shift the range transmission or engage the park lock for locking the drive shaft. The Hansen patent, U.S. Pat. No. 3,987,878, Range Shift and Park Lock Control, shows generally this type of a mechanism in which the control lever controls the range shift and the park lock. The applicant has also provided a shift mechanism with a common shift lever to selectively and alternatively shift the range transmission and to engage and disengage the park lock on the propeller shaft. The applicant, however, has provided for a control lever, a park lock control member and a gear shift control member all mounted on dual bearings within a control console. A slotted gate plate limits movement of the control lever and also provides a notch which can lock the park lock in its engaged position in response to a spring biasing the control lever to retain the lever in its park position. The gear shift for the range transmission is retained in position by suitable detent means in the transmission. The control lever is pivoted on two axes normal to each other to selectively move through the slotted gate plate to provide the gear shift or park lock.

It is an object of this invention to provide a range transmission shift and a park lock control for a tractor.

It is another object of this invention to provide a range transmission shift and park lock mechanism including a control lever and a park lock control member and a gear shift segment pivotally mounted on a control console for shifting gears of the range transmission and locking the drive shaft.

It is a further object of this invention to provide a park lock and range shift mechanism mounted on double bearings in the control console for selectively and alternatively operating the park lock or the range shift responsive to operation of the control lever.

The objects of this invention are accomplished by pivotally mounting a control lever, a park lock segment and a range shift segment on double bearing supports in a control console to define a common pivotal axis. The control lever is also pivotally mounted on an axis normal to the common axis for pivotally supporting the lever for selective and alternative engagement with each of the two control members engaging the park lock or shifting the range shift. Means are provided in the control console for locking the park lock in its engaged position and detent means in the transmission for retaining the range shift in its engaged position. Each of the double bearings includes flange bushings to provide radial and thrust bearings for pivotally supporting the control members and the control lever in the control console.

Referring to the drawings, the preferred embodiment of this invention is illustrated.

Figure 2:
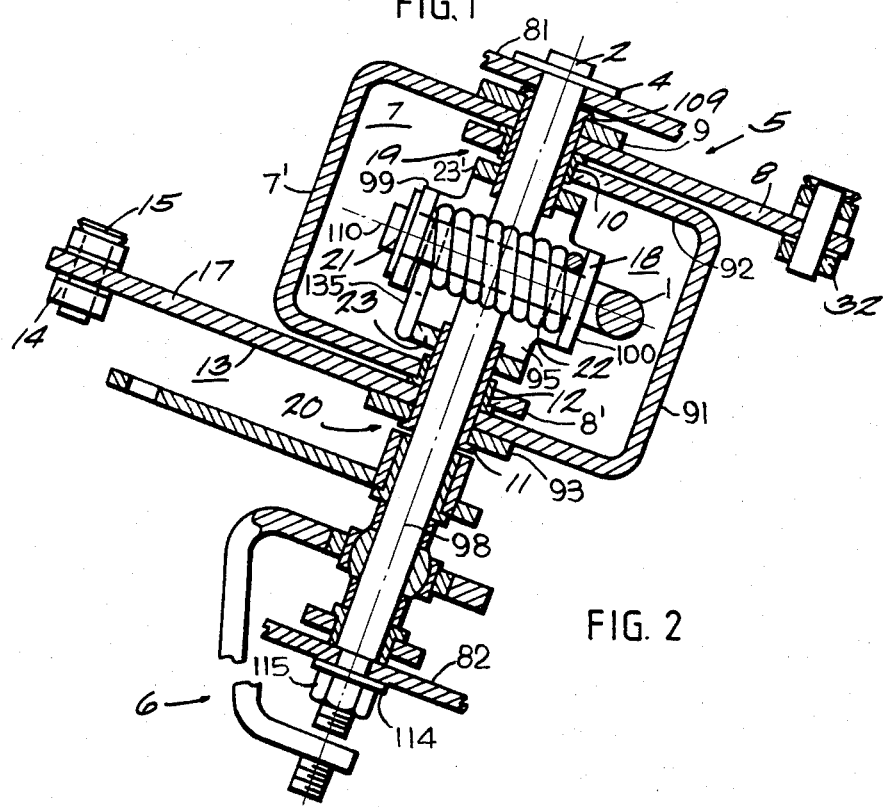
FIG. 2 is a cross-section view taken in line II—II of FIG. 3.
Figure 3:
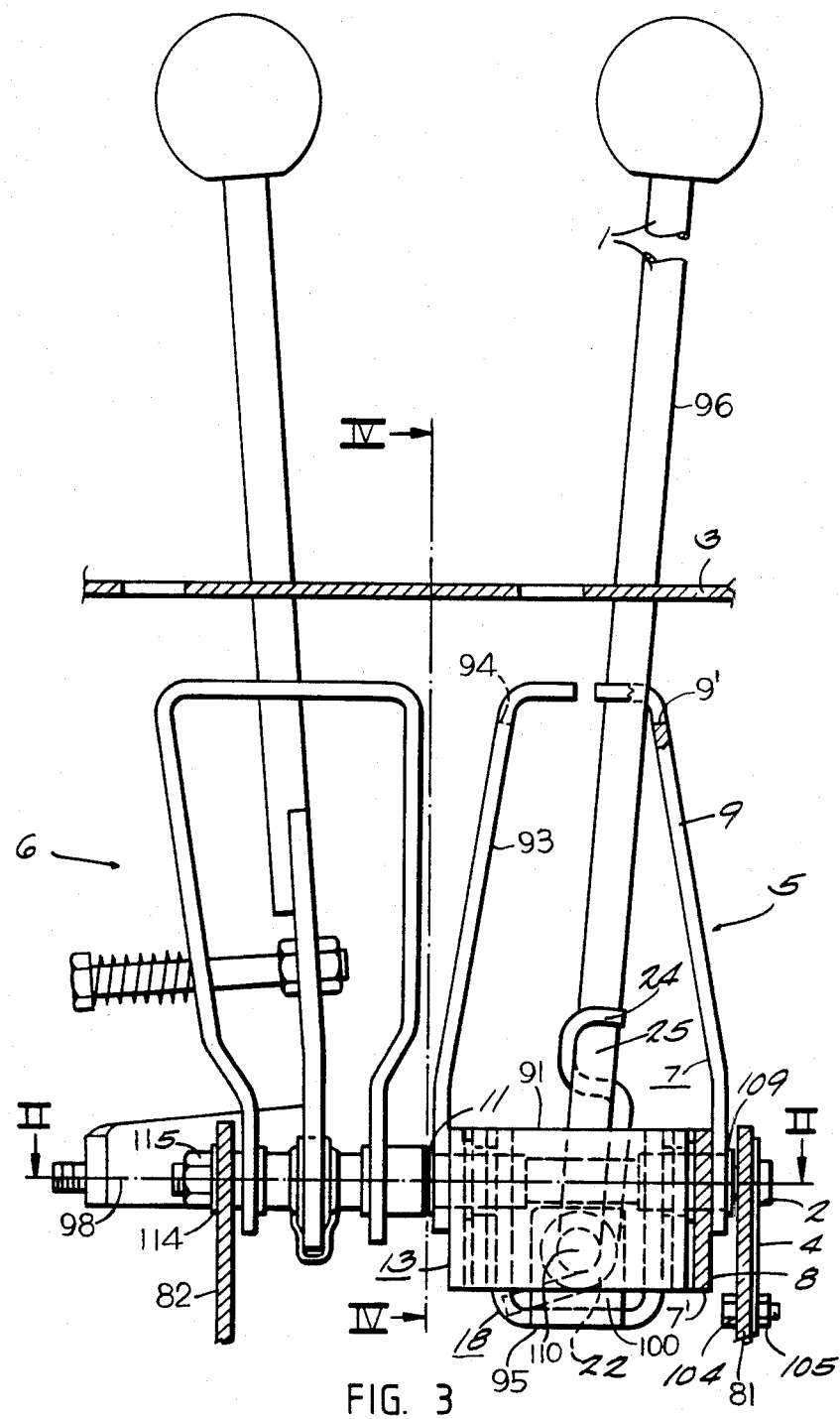
FIG. 3 is a cross-section view taken in line III—III of FIG. 1.
Figure 4:
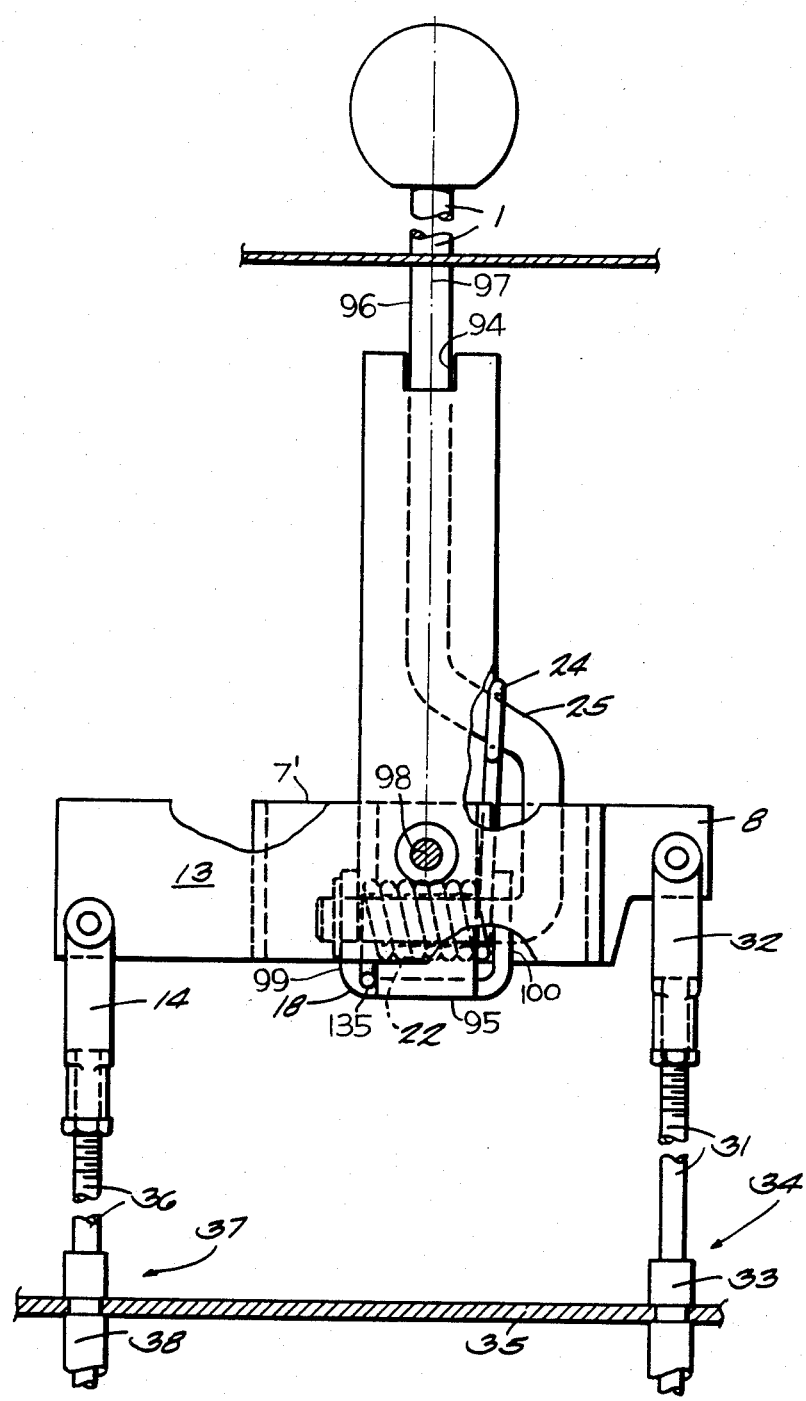
FIG. 4 is a cross-section view taken in line IV—IV of FIG. 3.

Referring to the drawings, a manually operable control lever 1 for selectively and alternatively operating either a range gear shift fork 41 or a park lock gear segment 45 is pivotally mounted on a horizontally disposed shaft 2. As shown in FIG. 3, one end of the shaft 2 includes a lug 4 which is secured to a vertical wall 81 of the console 3 by a bolt 104 and nut 105. The other end of the shaft 2 includes a threaded reduced diameter portion which extends through an opening in a vertical wall 82. A washer 114 and a nut 115 threaded on the reduced diameter portion of the shaft 2 secure the latter to the vertical wall 82. In addition to pivotally supporting the lever 1, the shaft 2 pivotally supports a gear shift mechanism 6 for a main transmission. The gear shift mechanism 6 forms no part of the present invention. The lever 1 is part of a park lock and range gear shift mechanism 5 by which the operator manually selects high or low range gear speeds and in the alternative, places the transmission in a park lock condition. The park lock and range gear shift mechanism 5 includes a range gear shift segment or control member 7 which includes a U-shaped base portion 7' having laterally spaced arms 8 and 8' which are pivotally mounted on the shaft 2 by bearing assemblies 19 and 20, respectively. As shown in FIG. 2, the bearing assembly 19 includes a bushing 109 carried by the shaft 2, and on which the long arm 8 is pivotally mounted, and an outer bushing 10 carried by the bushing 109. The bearing assembly 20 includes a similar pair of bushings 11, 12 with the outer bushing 12 pivotally supporting the short arm 8' of the U-shaped part of the gear shift control member 7. The long arm 8 extends horizontally rearward and, as shown in FIG. 4, is pivotally connected to a clevis 32 on the end of a range shift control cable 31 of a sheathed cable assembly 34. The sheathing 33 of the cable assembly 34 is secured to a horizontal platform 35 of the control console 3. The range gear shift member 7 includes an arm 9 extending upwardly alongside the control lever 1 and having its lower end secured by welding to the arm 8 of the U-shaped portion 7'. A seat in the form of a notch 9' is formed in the upper end of the upstanding arm 9 in confronting, registerable relation to the control lever 1.

A park lock control member 13 is similar to the range gear shift control member 7 in its construction and includes a U-shaped part 91 having a short arm 92 pivotally carried by bushing 10 and a long arm 17 pivotally carried by bushing 11. An upstanding arm 93 is welded at its lower end to the U-shaped part 91 and includes a seat in the form of a notch 94 at its upper end which opens in the direction toward the control lever 1 so as to be registerable therewith. The long arm 17 of the park lock control member 13 is pivotally connected by a pin 15 to a clevis 14 at one end of a control cable 36 of a sheathed cable assembly 37, the sheathing 38 of which is connected to the platform 35 of the console.

The control lever 1 includes a straight upper portion 96 whose longitudinal axis 97 (as shown in FIG. 4) intersects the axis 98 of the shaft 2. The lever also includes a dog leg portion near its lower end having a diagonal part 25 and a horizontal lower end portion 21 disposed in transverse relation to the axes 97 and 98. The end portion 21 of the lever 1 is pivotally supported in aligned bores in flanges 99, 100 extending upwardly from the horizontally disposed floor 95 of a bracket 18 for pivotal movement about a horizontal axis 110 normal to a vertical plane through the axis 98 of the shaft 1. The bracket 18 includes a pair of upstanding ears 23, 23' having aligned bores in bearing engagement with bushings 11, 109, whereby the bracket is pivotally mounted on the shaft 2 for rotation about the latter's axis 98. The main body of a coil spring 22 is coiled about the transverse lower end portion 21 of the lever 1 and has an upper end 24 bent around the diagonal part 25 of the lever 1. The other end of the coil spring terminates in a part 135 extending radially outwardly from the body of the coil and abutting the floor 95. The spring 22 biases the lever to pivot about the axis 110 toward the arm 9, thus releasably holding it in the notch 9' in arm 9 as shown in FIG. 3. In this position of the control lever, it is biased to one lateral side of a slot 27 in a gate plate 125.

The gate plate 125 is fastened by a plurality of bolts 26' to the control console 3. The gate plate 125 includes a slotted opening 26 including two parallel slots 27 and 28 connected by a neutral connecting slot 29. The slot 28 is formed with a notch 30 at one of its ends to receive the control lever 1 when the park lock mechanism is engaged. The lever 1 is releasably detained or retained in this position responsive to the force of the spring 22.

Figure 5:
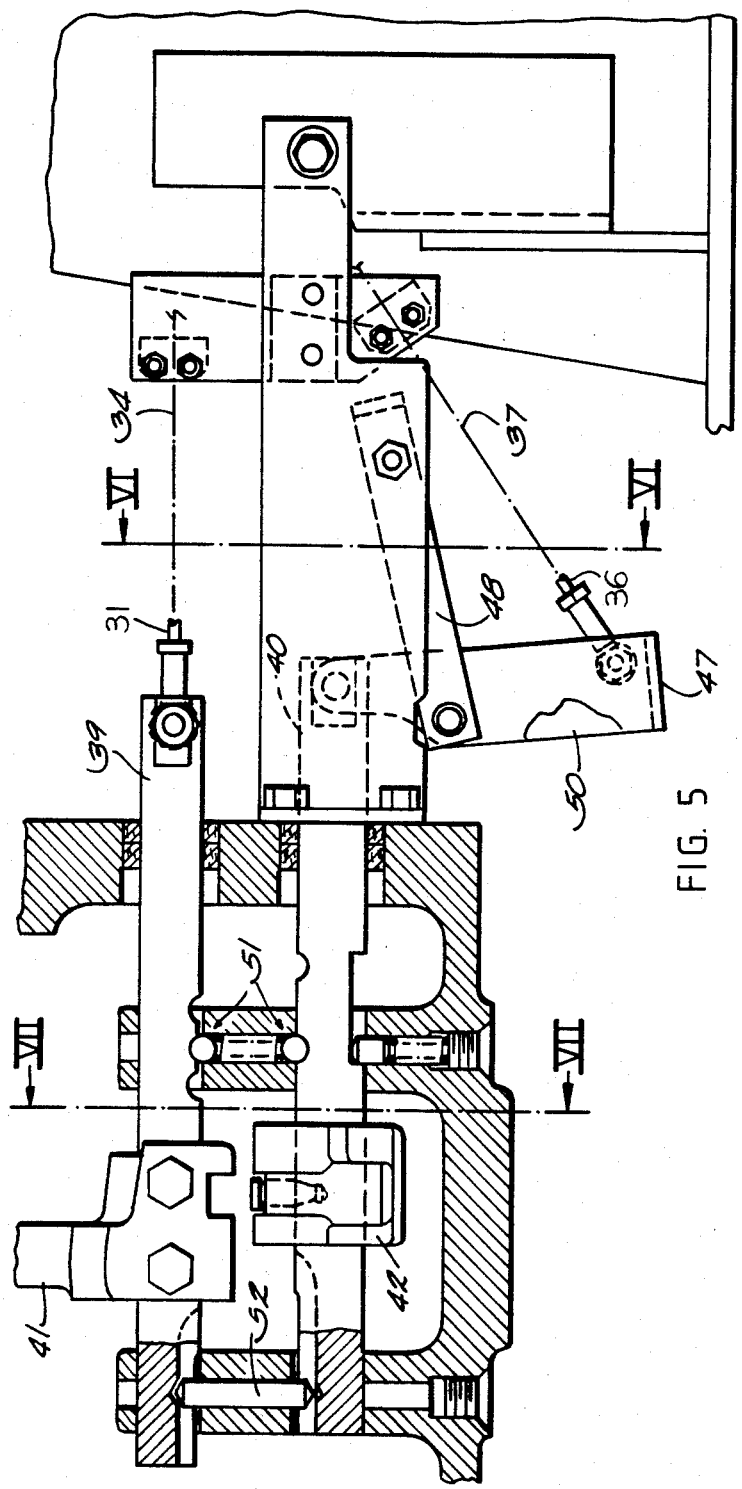
FIG. 5 is a plan view of the operating mechanism and the vehicle transmission.
Figure 7:
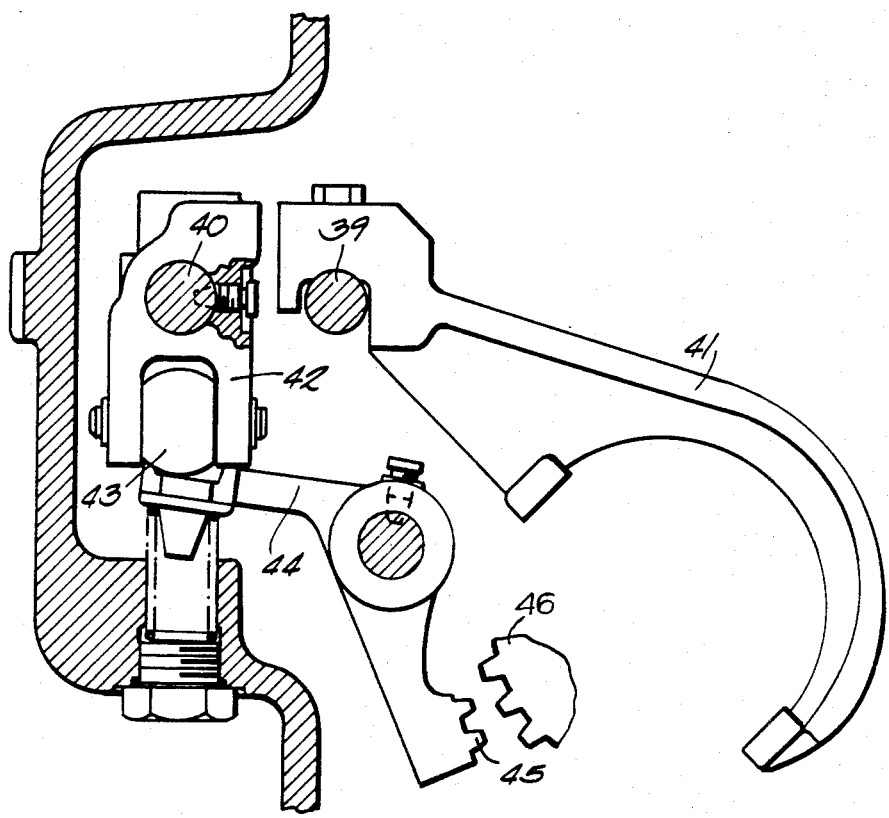
FIG. 7 is an end view of the shift rails taken on line VII—VII of FIG. 5.

Referring to FIGS. 5 and, 6 and 7 the cable 31 is shown connected to a gear shift rail 39 while the cable 36 is connected to a park lock rail 40. The gear shift rail 39 carries a gear shift fork 41 for selectively engaging high and low gears of the range shift transmission. As shown in FIG. 7, the park lock rail 40 carries a carriage 42 with a roller 43 which engages an arm of a park lock lever 44 causing the latter to rotate bringing its gear segment 45 into meshing engagement with an externally splined collar 46 which is spline connected to a propeller shaft.

Figure 1:
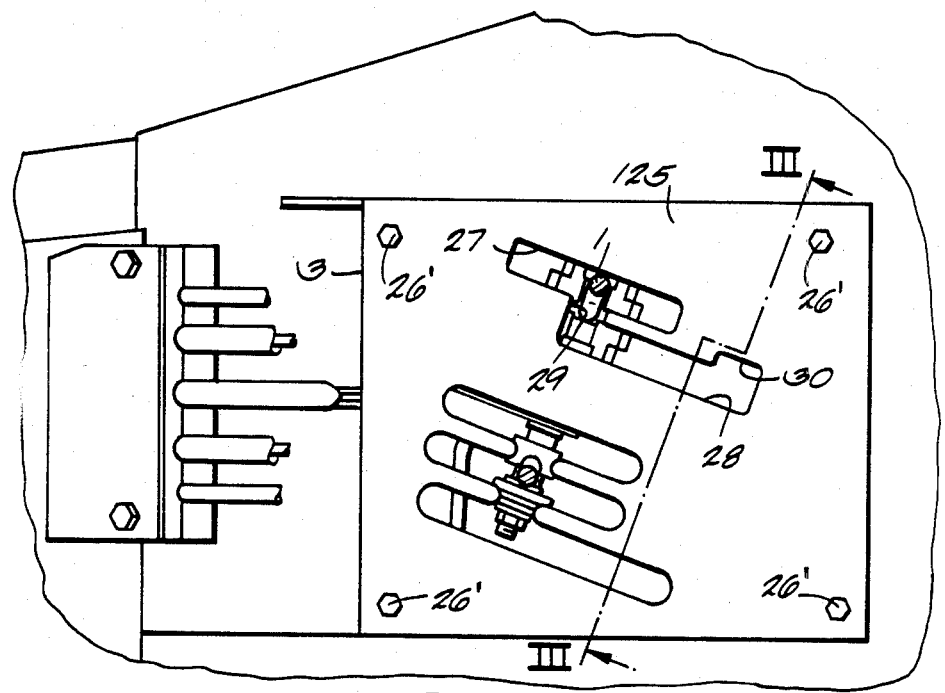
FIG. 1 illustrates a plan view of the gate plate and control mechanism.
Figure 6:
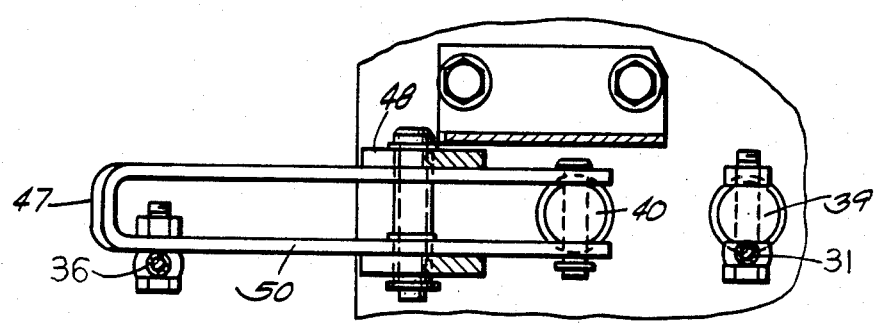
FIG. 6 is a cross-section view taken along line VI—VI of FIG. 5.

FIG. 6 shows the cable 31 connected to the gear shift rail 39 and cable 36 pivotally connected to a leg 50 of a lever 47 which in turn is pivotally connected to a mounting bracket 48. When the lever 47 is pivoted counterclockwise as viewed in FIG. 5 by movement of the control lever 1 to the seat 30 shown in FIG. 1, the park lock shift rail 40 is moved to the left from its non-locking position shown in FIG. 5 to a locking position causing engagement of the park lock mechanism on the propeller shaft of the vehicle. When the teeth of park lock segment 45 operatively engage the teeth of the spline collar 36, the tractor drive or propeller shaft is prevented from rotating thereby effecting a parking brake or park lock condition.

The operation of the device will be described in the following paragraphs.

The control lever 1 is pivotally mounted on the transverse axis 98 of the shaft 2 and on the longitudinal axis 110 of the end 21 of the control lever 1. Normally, the control lever 1 is biased by the spring 22 to the right-hand side of the slot 27. When the control lever 1 is shifted forward or backward in slot 27, the range shift clutch collar 41 is shifted responsive to movement of the shift rail 39. The detent 51 retains the shift rail in its shifted position. The interlock 52 prevents the park lock rail 40 from moving when the gear shift rail 39 is moved from its illustrated neutral position.

The park lock mechanism is actuated when the control lever 1 is moved into the slot 28 and then moved all the way to the notch 30. The biasing force of the spring 22 retains the control lever 1 in the notch 30 and retains the park lock mechanism in its engaged position. Movement of the control lever 1 operates the cable 36 to pivot the leg 50 of lever 47 to operate the park lock mechanism and engage the park lock to lock the propeller shaft of the vehicle. To release the park lock mechanism, the control lever 1 is removed from the notch 30 and moved to the neutral position at the neutral connecting slot. In this neutral position, the park lock mechanism is released and as the range gear shift mechanism is in neutral.

The embodiments of the invention in which an exclusive property or privilege is claimed are defined as follows:

1. A range shift and park lock control mechanism for a vehicle transmission comprising, a control console, a control lever, a range shift control member, a park lock control member, means pivotally mounting said control members on a common axis on said control console, a pivot bracket pivotally mounted on said control console on said common axis, means pivotally mounting said control lever on said pivot bracket for movement about a pivot axis lying in a plane normal to said common axis, said control members having confronting portions disposed at opposite sides of said control lever defining notches selectively engageable by said control lever whereby said gear shift mechanism and said park lock mechanism may be selectively engaged by said control lever so as to be operated one at a time, a gate plate on said control console defining a slotted opening through which said control lever extends including a pair of parallel slots for guiding said control lever during movement to effect range gear shift and park lock control, respectively, a transmission including a park lock mechanism and a gear shift mechanism, means connecting said park lock mechanism to said park lock control member, means connecting said gear shift mechanism to said range shift control member and biasing means operatively interposed between said pivot bracket and said control lever biasing the latter to pivot about said pivot axis toward said confronting portion of said range shift control member.

2. A range shift and park lock control mechanism for a vehicle transmission as set forth in claim 1 wherein each of said control members includes a U-shaped base having a pair of arms supported for pivotal movement on said common axis.

3. A range shift and park lock control mechanism for a vehicle transmission as set forth in claim 1 wherein said slotted opening in said gate plate defines two parallel, longitudinal slots and a cross slot defining the neutral position of said control lever.

4. A range shift and park lock control mechanism for a vehicle transmission as set forth in claim 1 wherein said pivot bracket includes a horizontal base and four vertical flanges with each flange being at a right angle to the preceding flange, annular openings in said flanges defining a pair of axes on which said lever is supported on said console for fore and aft and lateral movement about said axes, respectively.

5. A range shift and park lock control mechanism for a vehicle transmission as set forth in claim 1 wherein said control members each include a U-shaped base portion with one long arm and one short arm, the short arm of each member being adjacent the long arm of the other member, said long arms being connected to said gear shift and park lock mechanisms, respectively.

6. A range shift and park lock control mechanism for a vehicle transmission as set forth in claim 5 and further comprising a shaft on said console pivotally supporting said control members and said pivot bracket on said common axis, a first pair of axially spaced bushings carried on said shaft and pivotally supporting said long arms, respectively, and a second pair of axially spaced bushings carried by said first pair of bushings and pivotally supporting said short arms, respectively.

* * * * *